US012449491B2

United States Patent
Eberler et al.

(10) Patent No.: US 12,449,491 B2
(45) Date of Patent: Oct. 21, 2025

(54) DETERMINING A HEATING EFFECT OF A MRI SEQUENCE ON A DIAGNOSTIC MODALITY DUE TO THE TEMPERATURE VARIATIONS AND METHOD OF PREDICTING AND COMPENSATING THE VARIATIONS

(71) Applicant: Siemens Healthcare GmbH, Erlangen (DE)

(72) Inventors: Ludwig Eberler, Neumarkt (DE); Ralf Ladebeck, Erlangen (DE); Philipp Hoecht, Lauf (DE); Sanghee Cho, Knoxville, TN (US); Robert A. Mintzer, Knoxville, TN (US); Nan Zhang, Knoxville, TN (US); Johannes Breuer, Forchheim (DE); Martin Judenhofer, Knoxville, TN (US)

(73) Assignee: Siemens Healthineers AG, Forchheim (DE)

( * ) Notice: Subject to any disclaimer, the term of this patent is extended or adjusted under 35 U.S.C. 154(b) by 138 days.

(21) Appl. No.: 17/474,443

(22) Filed: Sep. 14, 2021

(65) Prior Publication Data
US 2022/0091206 A1 Mar. 24, 2022

(30) Foreign Application Priority Data
Sep. 22, 2020 (DE) ...................... 10 2020 211 844.2

(51) Int. Cl.
*G01R 33/38* (2006.01)
*A61B 5/055* (2006.01)
*G01R 33/54* (2006.01)

(52) U.S. Cl.
CPC .......... *G01R 33/3804* (2013.01); *A61B 5/055* (2013.01); *G01R 33/54* (2013.01)

(58) Field of Classification Search
CPC .. G01R 33/3804; G01R 33/54; G01R 33/481; A61B 5/055; A61B 6/037; A61B 6/4258; A61B 6/4417; A61B 6/4488
See application file for complete search history.

(56) References Cited

U.S. PATENT DOCUMENTS 9,606,245 B1 * 3/2017 Czarnecki ............... G01T 1/245
10,178,976 B2 * 1/2019 Liu .......................... F28F 1/14
(Continued)

FOREIGN PATENT DOCUMENTS

DE 102007044873 A1 4/2009

*Primary Examiner* — Serkan Akar
(74) *Attorney, Agent, or Firm* — Harness, Dickey & Pierce, P.L.C.

(57) ABSTRACT

A method is for determining a heating effect of an imaging sequence of a second imaging modality on a detector of a first modality of a combined imaging device in dependence of a reference imaging sequence of the second imaging modality. A further method is for compensating a heating effect of an imaging sequence of a second imaging modality on a detector of a first modality of a combined imaging device. Furthermore, a combined imaging device includes a magnetic resonance imaging device and a first modality including a detector and a temperature compensation unit configured to compensate for a temperature variation of the detector. The combined imaging device is configured to perform a method for determining a heating effect of an imaging sequence of the magnetic resonance imaging device on the detector of the first modality in dependence of a reference imaging sequence of the magnetic resonance imaging device.

18 Claims, 4 Drawing Sheets

(56) References Cited

U.S. PATENT DOCUMENTS

2009/0114827 A1    5/2009   Burbar et al.
2020/0289074 A1*   9/2020   Zilberstien ........... A61B 6/4275
2023/0147433 A1*   5/2023   Doguet ................ A61B 5/0017
                                                                                                   607/60

* cited by examiner

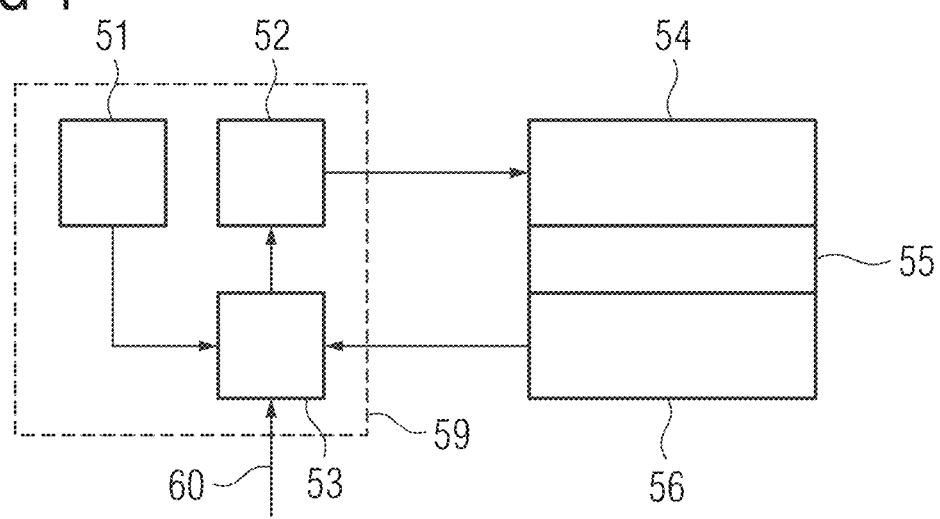

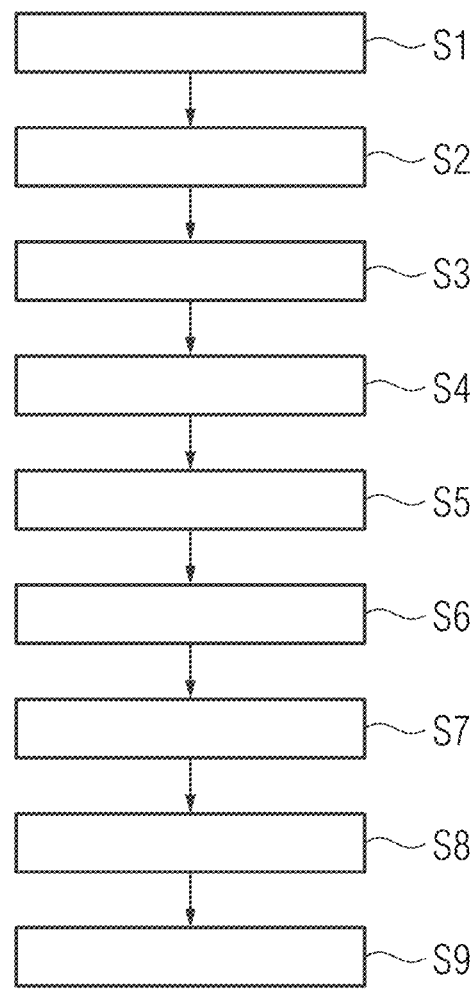
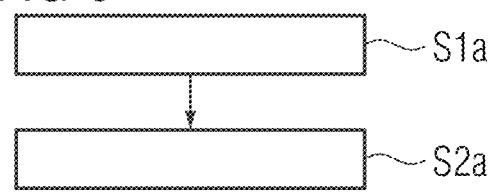

DETERMINING A HEATING EFFECT OF A MRI SEQUENCE ON A DIAGNOSTIC MODALITY DUE TO THE TEMPERATURE VARIATIONS AND METHOD OF PREDICTING AND COMPENSATING THE VARIATIONS

PRIORITY STATEMENT

The present application hereby claims priority under 35 U.S.C. § 119 to German patent application number DE 102020211844.2 filed Sep. 22, 2020, the entire contents of which are hereby incorporated herein by reference.

FIELD

Example embodiments of the invention generally relate to a method for determining a heating effect of an imaging sequence of a second imaging modality on a detector of a first modality of a combined imaging device in dependence of a reference imaging sequence of the second imaging modality. Example embodiments of the invention further relate to a method for compensating a heating effect of an imaging sequence of a second imaging modality on a detector of a first modality of a combined imaging device. Furthermore, example embodiments of the invention relates to a combined imaging device, comprising a magnetic resonance imaging device and a first modality including a detector and a temperature compensation unit configured to compensate for a temperature variation of the detector, wherein the combined imaging device is configured to perform a method for determining a heating effect of an imaging sequence of the magnetic resonance imaging device on the detector of the first modality in dependence of a reference imaging sequence of the magnetic resonance imaging device.

BACKGROUND

In medical diagnostics, particularly imaging diagnostics, examinations are often carried out by way of combined imaging devices, which comprise more than one diagnostic modality, typically two diagnostic modalities. In these examinations, diagnostic data is collected from an examination object by way HOD of several, particularly two, diagnostic modalities. For example, image data may be acquired with imaging modalities such as magnetic resonance imaging, positron emission tomography or single-photon emission computer tomography. It is particularly useful to combine diagnostic modalities that capture both structural information (e.g. by magnetic resonance imaging tomography) as well as functional information of the examination object (e.g. by positron emission tomography). Thus, an assessment of the diagnostic data of the examination object can be facilitated and an accuracy of a diagnosis can be increased. However, for some diagnostic purposes it may also be useful to combine multiple diagnostic modalities configured to capture structural information or even non-imaging diagnostic modalities.

However, combining different diagnostic modalities in a combined imaging device also bears limitations. For example, a limitation particularly associated with magnetic resonance imaging devices is heating of electrical conductors and other components due to an application of gradient magnetic fields and high frequency electromagnetic fields. In a magnetic resonance imaging device, gradient magnetic fields are typically induced by passing an electric current through electromagnetic coils with nonzero resistivity which at least partially enclose an image acquisition region. A portion of the electric current transported through the coils is transformed into heat energy, heating-up parts of the magnetic resonance imaging device. However, heating may also occur in more distanced components of the combined imaging device due to eddy-currents induced in electrical conductors when applying a magnetic field. This may cause heating of parts of a detector module, printed circuit boards (PCB), electromagnetic shielding or electrically conductive housings of further diagnostic modalities of the combined imaging device. Moreover, high frequency electromagnetic fields may be absorbed in components of the combined imaging device, thus contributing to the overall heating effect.

The gradient magnetic fields and high frequency electromagnetic fields are commonly applied as pulses. The amplitude, duration, slew rate and time interval of these pulses may follow a pre-calculated sequence and will typically vary considerably during a magnetic resonance examination or in different types of magnetic resonance examinations.

SUMMARY

The inventors have discovered that this can lead to a sudden heating of components of the combined imaging device. A temperature compensation unit, as for example a fluid circulation system, may be employed to compensate for heating effects. However, due to the sudden onset of the heating effect, short-term temperature variations may not be entirely prevented. Furthermore, the inventors have discovered that gradient induced eddy-currents may cause an inhomogeneous temperature distribution, as the heating effect changes in dependence of a geometrical orientation of an electrical conductor with respect to the gradient magnetic fields. As a consequence, the inventors have discovered that heating effects may compromise the quality of diagnostic data acquired via the combined imaging device, particularly when a detector module of a further diagnostic modality is affected.

At least one embodiment of the invention provides accurate information on a heating effect of a magnetic resonance examination on a further diagnostic modality of a combined imaging device. At least one embodiment of the invention further provides improved quality of diagnostic data acquired via a combined imaging device.

Embodiments of the invention are directed to a method, a combined imaging device and a computer program product according to an embodiment of the invention. Further advantageous embodiments are specified in the claims.

According to at least one embodiment of the inventive method, a heating effect of an imaging sequence of a second imaging modality on a detector of a first modality of a combined imaging device is determined in dependence of a reference imaging sequence of the second imaging modality, wherein the first modality is configured to acquire diagnostic data of an examination object and the second imaging modality comprises a magnetic resonance imaging device configured to acquire magnetic resonance image data of the examination object, wherein the first modality comprises a temperature compensation unit configured to compensate a temperature variation of the detector.

At least one embodiment of the inventive is directed to a combined imaging device comprises a magnetic resonance imaging device and a first modality including a detector and a temperature compensation unit configured to compensate for a temperature variation of the detector. The combined imaging device is configured to acquire diagnostic data and magnetic resonance image data of an examination object positioned in an image acquisition region of the combined imaging device and to perform a method according to one of the embodiments described.

In least one embodiment, the inventive computer program product can be loaded into a memory of a programmable processing unit of a combined imaging device and comprises program code segments to perform a method according to an embodiment of the invention when the computer program product is executed in the processing unit of the combined imaging device.

At least one embodiment of the invention is directed to a method for determining a heating effect of an imaging sequence of a second imaging modality on a detector of a first modality of a combined imaging device in dependence of a reference imaging sequence of the second imaging modality, the first modality being configured to acquire diagnostic data of an examination object, the second imaging modality including a magnetic resonance imaging device configured to acquire magnetic resonance imaging data of the examination object, and the first modality including a temperature compensation unit configured to compensate a temperature variation of the detector, the method comprising:

performing a reference imaging sequence using the second imaging modality, the reference imaging sequence including applying at least one of a gradient magnetic field and a high frequency electromagnetic field to the image acquisition region of the combined imaging device, and the reference imaging sequence including a plurality of imaging parameters determining a property of the at least one of the gradient magnetic field and the high frequency electromagnetic field;

acquiring at least one temperature dependent parameter of the detector of the first modality; and determining a heating effect on the detector of the first modality in dependence of the plurality of imaging parameters of the reference imaging sequence and the at least one temperature dependent parameter of the detector.

At least one embodiment of the invention is directed to a method for compensating a heating effect of an imaging sequence of a second imaging modality on a detector of a first modality of a combined imaging device, the first modality being configured to acquire diagnostic data of an examination object, the second imaging modality including a magnetic resonance imaging device configured to acquire magnetic resonance imaging data of the examination object, and the first modality including a temperature compensation unit configured to compensate a temperature variation of the detector, the method comprising:

determining the heating effect of the imaging sequence of the second imaging modality on the detector of the first modality using a model-based approach; and adjusting a compensation parameter of the temperature compensation unit in dependence of the heating effect determined.

At least one embodiment of the invention is directed to a combined imaging device, comprising:

a magnetic resonance imaging device; and a first modality including a detector and a temperature compensation unit, configured to compensate for a temperature variation of the detector, the combined imaging device being configured to acquire diagnostic data and magnetic resonance imaging data of an examination object positioned in an image acquisition region of the combined imaging device, and the combined imaging device being configured to at least:

perform a reference imaging sequence using the second imaging modality, the reference imaging sequence including applying at least one of a gradient magnetic field and a high frequency electromagnetic field to the image acquisition region of the combined imaging device, and the reference imaging sequence including a plurality of imaging parameters determining a property of the at least one of the gradient magnetic field and the high frequency electromagnetic field;

acquire at least one temperature dependent parameter of the detector of the first modality; and determine a heating effect on the detector of the first modality in dependence of the plurality of imaging parameters of the reference imaging sequence and the at least one temperature dependent parameter of the detector.

At least one embodiment of the invention is directed to a non-transitory computer program product, loadable into a memory of a programmable processing unit of a combined imaging device, storing program code segments to perform a method of an embodiment when the computer program is executed in the processing unit of the combined imaging device.

BRIEF DESCRIPTION OF THE DRAWINGS

Further advantages and details of the present invention may be recognized from the embodiments described below as well as the drawings. The figures show.

DETAILED DESCRIPTION OF THE EXAMPLE EMBODIMENTS

Figure 1:
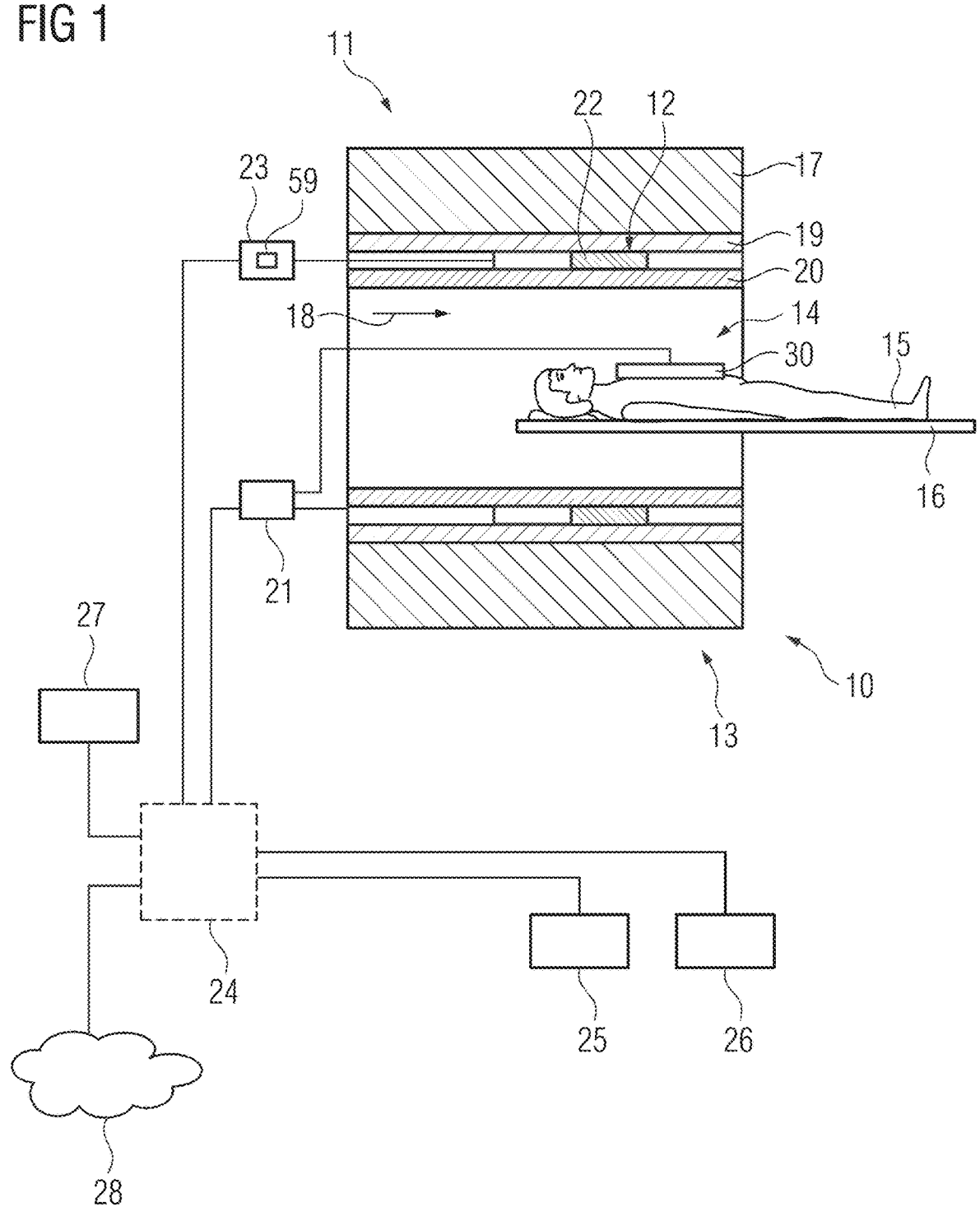
FIG. 1 a schematic representation of a combined imaging device according to an embodiment of the invention, FIG. 2 an example temperature distribution in a detector module, FIG. 3 a schematic temperature development in a detector module over a course of an imaging sequence, FIG. 4 a schematic representation of an embodiment of an inventive temperature compensation unit, FIG. 5 a flowchart of an embodiment of an inventive method, FIG. 6 a flowchart of an embodiment of an inventive method.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Bluray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the inventive method, a heating effect of an imaging sequence of a second imaging modality on a detector of a first modality of a combined imaging device is determined in dependence of a reference imaging sequence of the second imaging modality, wherein the first modality is configured to acquire diagnostic data of an examination object and the second imaging modality comprises a magnetic resonance imaging device configured to acquire magnetic resonance image data of the examination object, wherein the first modality comprises a temperature compensation unit configured to compensate a temperature variation of the detector.

The magnetic resonance imaging device may comprise a magnet arrangement with at least one magnet. Preferably, the magnet arrangement is configured to provide a magnetic field in an image acquisition region of the magnetic resonance imaging device. The magnetic field may be suitable for acquiring magnetic resonance image data of the examination object. It is conceivable, that the magnetic field provided by the magnet arrangement is a homogenous magnetic field or a gradient magnetic field. It is also conceivable, that the magnet arrangement is configured to provide a high frequency electromagnetic field in the image acquisition region. In one embodiment, a homogenous magnetic field in the image acquisition region may be superimposed by a gradient magnetic field and/or a high frequency electromagnetic field. The electromagnetic field may be induced by an electric current passing through coiled wires of the magnet arrangement. An image acquisition region may be a dedicated space wherein the examination object is positioned in order to acquire magnetic resonance image data of the examination object. An examination object may for instance be a patient or any desired body region of a patient.

The first modality is configured to acquire diagnostic data of an examination object. Diagnostic data may comprise structural data, functional data or other data used for determination of a physical and/or medical condition of the examination object. Functional data may include any kind of data providing information on bioactivity within the examination object. For example, bioactivity may comprise blood flow, movement of tissue, as well as absorption, distribution, metabolism and excretion of drugs or other substances in the examination object. In a preferred embodiment, the first modality is a single-photon emission computed tomography device or a positron emission tomography device.

In such devices, radiation from a radiopharmaceutical injected into the examination object is detected and used to determine the distribution and/or the metabolism of the radiopharmaceutical in the examination object. In another embodiment, the first modality comprises a diagnostic sonography device configured to acquire functional data and structural imaging data of the examination object.

It is also conceivable, that the first modality is an electrocardiography device, which is configured to produce an electrocardiogram comprising information on an electrical activity of a heart of the examination object. Of course, the combined imaging device may comprise other modalities configured to acquire diagnostic data of the examination object. However, instead or in addition to the first modality, the imaging sequence of the magnetic resonance imaging device may further cause a heating effect on electronic components of an automated therapeutical device, as for example a catheter-robot or an automated surgical device, positioned in proximity to the magnetic resonance imaging device.

It is conceivable, that the heating effect causes deviations in quality of positioning of surgical instruments of the automated therapeutical device. Thus, determining a heating effect of the imaging sequence on an automated therapeutical device may advantageously increase positioning accuracy of surgical instruments.

Preferably, the first modality and the second imaging modality are mechanically connected, thus providing a joined combined imaging device. For example, the detector of a single-photon emission computed tomography device or a positron emission tomography device may be incorporated within a gantry of the magnetic resonance imaging device. However, the first modality and the second imaging modality may also be separate components or modules, which may be assembled to form the combined imaging device for specific diagnostic purposes. It is conceivable, that the first modality is carried by the second imaging modality or positioned in proximity to the second imaging modality. For example, such specific diagnostic purposes may comprise acquiring an electrocardiogram while scanning coronary vessels of an examination object via the magnetic resonance imaging device.

The detector of the first modality may be any detector configured to acquire diagnostic data of the examination object. Particularly, the detector may be configured to acquire image data of a patient. It is conceivable, that the detector is configured to acquire signals from a body region of the patient, which may be used to derive spatially resolved structural and/or functional information on the body region of the patient. In one embodiment, the detector may comprise a photon-sensitive material configured to record impacting photons from the examination object.

In another embodiment, the detector may comprise a piezoelectric transducer configured to emit and receive sound waves. An imaging sequence performed by the magnetic resonance imaging device may cause eddy currents in electric conductors of the detector of the first modality and thus increase a temperature of the detector. The detector of the first modality may comprise a temperature dependency. Due to the temperature dependency of the detector, a quality of the diagnostic data acquired by the detector may be reduced when the imaging sequence is performed via the magnetic resonance imaging device. The imaging sequence may represent any imaging sequence typically used in a diagnostic examination procedure with a magnetic resonance imaging device. In particular, the imaging sequence may differ from a reference imaging sequence in at least one imaging parameter.

The first modality comprises a temperature compensation unit configured to compensate for a temperature variation of the detector. A temperature variation may represent temporal and/or spatial temperature changes of the detector. In one embodiment, the temperature compensation unit may comprise a temperature sensor. The temperature sensor may be positioned in proximity to or within the detector and configured to acquire a temperature value of the detector.

In a further embodiment, the temperature compensation unit may be configured to determine a temperature variation of the detector in dependence of a temperature dependent parameter of the first modality. Preferably, the temperature compensation unit is configured to adjust a compensation parameter in dependence of the temperature value provided by the temperature sensor and/or the temperature dependent parameter in order to compensate for undesired temperature variations in the detector module.

A compensation parameter may be configured to adjust a temperature of the detector and/or a temperature dependent parameter of the detector. For example, the compensation parameter may be a bias voltage supplied to the detector. The bias voltage may be adjusted in dependence of the temperature value of the detector and a calibration curve in order to compensate for temperature variations in the detector. It is also conceivable, that the compensation parameter comprises a flow rate and/or a temperature of a cooling fluid of a cooling system configured to provide cooling to the detector module. Thus, the temperature of the detector may be directly affected by the compensation parameter.

In one step of at least one embodiment of the inventive method, a reference imaging sequence is performed with the second imaging modality, wherein the reference imaging sequence comprises applying a gradient magnetic field and/or a high frequency electromagnetic field to the image acquisition region of the combined imaging device and wherein the reference imaging sequence comprises a plurality of imaging parameters determining a property of the gradient magnetic field and/or the high frequency electromagnetic field.

The gradient magnetic field may be generated by dedicated gradient coils of the magnetic resonance imaging device. With the aid of the gradient magnetic field, magnetic resonance signals of the examination object may be spatially encoded, making it possible to assign received magnetic resonance signals to a volume element within the examination object. In one embodiment, the gradient magnetic field may comprise a phase encoding gradient magnetic field, a frequency encoding gradient magnetic field and a spatial encoding gradient magnetic field.

The magnetic resonance imaging device may further comprise a dedicated coil, for example a body coil, configured to provide a high frequency electromagnetic field in the image acquisition region of the magnetic resonance imaging device. The high frequency electromagnetic field and/or the gradient magnetic field may be provided by passing an electric current through respective electrically conducting wires or coils of the magnet arrangement, thus inducing the magnetic field in the image acquisition region. The electric currents and the resulting magnetic field may dependent on a plurality of imaging parameters of the reference imaging sequence.

For example, the magnetic field within the image acquisition region may change repeatedly within a time frame of a few microseconds, a few milliseconds, or a few seconds when performing the reference imaging sequence. The reference imaging sequence may be any imaging sequence used in a conventional diagnostic examination of a patient. It is also conceivable, however, that the reference imaging sequence comprises a predetermined set of imaging parameters selected to cause a specific heating effect in the detector module of the first modality.

In one embodiment, the first modality may be a single-photon emission computed tomography device or a positron emission tomography device with a photon-sensitive detector. The photon-sensitive detector may comprise a photon-sensitive material, i.e. a scintillator or a directly converting material, and a photodetector. The photodetector may include an array of photodiodes or silicon photomultipliers (SiPM) or a charge-coupled device, configured to provide an electric signal in dependence of a signal provided by the photon-sensitive material. A directly converting material may be configured to convert photons into an electric current. Examples for directly converting materials are Cadmium-Zink-Telluride, Cadmium-Telluride, Thallium-Bromide and the like. The detector may be incorporated within the gantry of the combined imaging device and comprise electrical conductors configured to transport electrical currents from the photodetector to a dedicated evaluation unit.

Due to changes of the magnetic field over a course of the reference imaging sequence, eddy currents may be induced in the electrical conductors of the detector, thus causing a heating effect on the detector. It is also conceivable, that the high frequency electromagnetic field is absorbed in parts of the detector, thus adding to the heating effect. However, the reference imaging sequence may also cause a heating effect in electronic conductors of other components positioned in proximity of the gantry of the combined imaging device. For example, eddy currents may also be induced in the piezoelectric transducer of a diagnostic sonography device or in electronic components of an electrocardiography device when combining these modalities with the magnetic resonance imaging device for specific diagnostic purposes.

In a further step of at least one embodiment of the inventive method, at least one temperature dependent parameter of the detector of the first modality is acquired.

The at least one temperature dependent parameter may comprise a signal noise of the detector, a signal output of the detector, a temperature value of the detector, a temperature of a cooling fluid of a cooling system and the like. As described above, the temperature compensation unit and/or the detector may comprise a temperature sensor configured to acquire the temperature value in proximity to the detector.

In one embodiment, the first modality may be a single-photon emission computed tomography device or a positron emission tomography device with a photon-sensitive detector and a temperature sensor configured to acquire a temperature value of the photon-sensitive detector. The temperature sensor may be positioned adjacent to the photon-sensitive detector in order to avoid limiting a surface area of the photon-sensitive material. Depending on the relative position between the temperature sensor and the photon-sensitive detector and/or a thermal conductivity of a material connecting the temperature sensor to the photon-sensitive detector, the acquired temperature value may not represent the actual temperature level in the photon-sensitive detector. For example, the acquired temperature value may indicate the temperature of the photon-sensitive detector with a delay or even with an offset due to a time required for heat conduction and thermal inertia of the involved materials.

In a further example, the at least one temperature dependent parameter may be a signal output of the detector, i.e. a photopeak level or a bias current provided by the photon-sensitive detector of a single-photon emission computed tomography device or a positron emission tomography device. The photopeak level may designate an energy level at which a majority of photons are deposited in the photon-sensitive material. The photopeak level of the detector may be temperature dependent. For example, the photopeak level may change in dependence of the temperature of the photon-sensitive detector, in particular of the temperature of the photodetector, although a rate of incoming photons may be constant. In one embodiment, the photodetector may comprise an array of avalanche photodiodes (APD) with a semiconductor material as a multiplication region. Suitable semiconductors are for example Silicon, Germanium, Cadmium-Zink-Telluride, Mercury-Cadmium-Telluride, Indium-Gallium-Arsenide and the like.

In a further example, the at least one temperature dependent parameter may be a signal noise of the photon-sensitive detector. The signal noise may be caused by temperature dependent generation-recombination processes within the photodetector. Even in the absence of radiation, these processes may initiate avalanche processes in the photodetector generating a signal count. An average number of counts per second in absence of radiation is commonly referred to as a dark count rate. As the dark count rate changes in dependence of the temperature of the photodetector, the dark count rate may be used as a temperature dependent parameter. Further examples of temperature dependent parameters are a power consumption of the detector and a detector count rate. In particular, the power consumption of the detector may encompass a power consumption of the photodetector. However, power consumptions of other electronic components of the detector may also be used as temperature dependent parameters. The detector count rate may change when the photo peak level changes if a comparator threshold of the detector is kept constant. Thus, the detector count rate may also be used as a temperature dependent parameter. Of course, the combined imaging device may comprise other temperature dependent variables which may be used as temperature dependent parameters according to at least one embodiment of the inventive method.

Preferably, a time interval for acquiring the at least one temperature dependent parameter of the detector at least partially overlaps with a time interval for performing the reference imaging sequence of the magnetic resonance imaging device. Thus, the at least one acquired temperature dependent parameter may indicate a heating effect caused by the reference imaging sequence.

In a further step of at least one embodiment of the inventive method, the heating effect on the detector of the first modality is determined in dependence of the plurality of imaging parameters of the reference imaging sequence and the at least one temperature dependent parameter of the detector.

The heating effect may be characterized by a temperature of the detector, as well as other components of the combined medical imaging device, i.e. electrical conductors in the magnetic resonance imaging device and/or the first modality. It is conceivable, that the heating effect comprises a temperature value, a temperature distribution and/or a temporal temperature variation in the detector or individual modules of the detector. However, the heating effect may also be characterized by a temperature dependent property of the detector. For example, the heating effect may be quantified as an offset or a variation of a signal output of the detector.

In order to determine the heating effect, the temperature value acquired by the temperature sensor may be complemented with at least one further temperature dependent parameter. For example, the temperature value may be corrected or adjusted in dependence of the photopeak level of the detector. The photopeak level may comprise a higher spatial resolution and/or a faster reaction to temperature changes compared to the temperature value provided by the temperature sensor, as the photopeak level can be read out directly from a plurality of photodetectors of the photon-sensitive detector. However, the photopeak level may also be interpreted as a temperature dependent property of the photon-sensitive detector and may be converted into a temperature equivalent in order to complement the temperature value acquired via the temperature sensor.

It is also conceivable, that the heating effect on the detector is determined without acquiring a temperature value of the temperature sensor. For example, the photopeak level or the dark count rate may be used to determine the temperature distribution in the photon-sensitive detector by way HOD of a model. Such a model may be configured to determine the heating effect in dependence of a physical correlation between a temperature dependent parameter and the temperature distribution in the detector.

In one embodiment, determining the heating effect may comprise deriving a calibration function and/or a calibration database associating the plurality of imaging parameters of the reference imaging sequence with the at least one temperature dependent parameter. Thus, when performing an imaging sequence during a diagnostic examination of a patient, the temperature development of the detector may be determined by way HOD of the calibration function and/or the calibration database. In a further embodiment, determining the heating effect of an imaging sequence may comprise using a regression analysis. The regression analysis may estimate the heating effect in dependence of the at least one temperature dependent parameter and the respective plurality of imaging parameters of the reference imaging sequence, as well as a plurality of imaging parameters of the imaging sequence. However, the heating effect may also be determined in dependence of a database using interpolation or extrapolation methods. The database may be provided by the calibration function or calibration database described above or be obtained from other combined imaging devices via a network connection. In further conceivable embodiments, the heating effect on the detector may also be determined in dependence of a model or an intelligent algorithm.

It is conceivable, that the steps of at least one embodiment of the inventive method described above are performed multiple times or in an iterative manner. In each iteration of at least one embodiment of the inventive method, the reference imaging sequence may change or remain the same. It is also conceivable, that individual steps of at least one embodiment of the inventive method, as for example the acquisition of the at least one temperature dependent value and/or the determination of the heating effect on the detector, are performed multiple times within a time interval of performing one reference imaging sequence.

At least one embodiment of the inventive method allows for a determination of the heating effect in dependence of any temperature dependent parameter. Thus, a temperature sensor for acquiring a temperature value of the detector may favorably be avoided and manufacturing costs of the combined imaging device may be reduced.

In determining the heating effect of an imaging sequence of the magnetic resonance imaging device on the detector of the first modality, the temperature compensation unit of the first modality can be advantageously controlled to compensate for temperature variations in the detector and/or an inaccurate temperature value acquired via a temperature sensor positioned in proximity to the detector of the first modality.

Thus, a signal output of the detector can be corrected in dependence of the determined heating effect in such way that an accuracy of data acquired by the first modality can be enhanced and a quality of the diagnostic data acquired with the combined imaging device can be increased advantageously.

In one embodiment, the inventive method comprises the step of positioning a radiation source in a relative position to an image acquisition region of the combined imaging device, the radiation source being configured to emit a predefined level of radiation in a direction of the detector of the first modality.

In this embodiment, the first modality preferably comprises a single-photon emission computed tomography device or a positron emission tomography device. The detector of the first modality may be configured to receive gamma photons emitted from an examination object positioned in the image acquisition region of the combined imaging device. In the case of a single-photon emission computed tomography device, the radiation source may comprise a gamma-emitting tracer such as technetium-99m, iodine-123, indium-111 and the like, emitting gamma rays with a photon energy in the range of approximately 10 to 500 keV.

In the case of a positron emission tomography device, positron-emitting tracers may be used as a radiation source. The emitted positrons may travel through the imagine acquisition region until encountering an electron and annihilating into a pair of annihilation photons with an energy of about 511 keV, moving approximately in opposite directions. In one embodiment, the examination object may comprise a radiopharmaceutical, such as a positron-emitting tracer or a gamma-emitting tracer, as well as a phantom containing the radiopharmaceutical. The radiopharmaceutical may be incorporated into compounds normally used in examination objects such as glucose, water, or ammonia, or molecules that bind to receptors or other sites of drug action within the examination object.

The phantom may further comprise tissue or fabric to provide suitable electrons to interact with the emitted positrons. Examples of conceivable positron-emitting tracers are carbon-11, nitrogen-13, oxygen-15, fluorine-18, gallium-68, zirconium-89, rubidium-82 and the like. However, it is also conceivable, that a gamma-emitting tracer is used as a radiation source for the positron emission tomography device. Such a gamma-emitting tracer preferably comprises a photon energy in the range of approximately 100 to 1500 keV. In one embodiment, the radiation source may comprise a Lutetium Oxyorthosilicate (LSO) crystal. The LSO crystal may provide a background radiation which can be detected via the detector of the first modality.

The radiation source is configured to emit a predefined level of radiation in a direction of the detector of the first modality. A predefined level of radiation may signify that the radiation source emits an approximately constant number of photons or positrons over a predefined amount of time, i.e. several seconds, several minutes or several hours. Preferably, the radiation source is configured to emit radiation uniformly in all spatial directions. A predefined level of radiation may also signify that an energy of emitted gamma photons is well defined or known.

Positioning the radiation source in a relative position to the image acquisition region of the combined imaging device may comprise moving the radiation source into an isocenter of the first modality or in proximity to the isocenter of the first modality. For example, the radiation source may be positioned via a patient positioning device configured to transport a patient along an axis of the gantry of the combined imaging device. However, the radiation source may also be positioned in a distance to the isocenter of the first modality. For example, the distance between the radiation source and the isocenter of the first modality may be several centimeters, several ten centimeters or several meters. It is also conceivable, that the radiation source is positioned outside the image acquisition region. A relative position of the radiation source to the image acquisition region may be chosen in such a way, that radiation emitted from the radiation source may pass a distance between the detector and the radiation source in an uninterrupted manner.

In one embodiment, the radiation source may comprise a plurality of separate radiation sources or phantoms, distributed around an image acquisition region of the first modality.

Preferably, a time interval during which radiation is emitted via the radiation source and received via the detector at least partially overlaps with a time interval during which the reference imaging sequence is performed and the at least one temperature dependent parameter is acquired.

By using a radiation source, a photopeak level can be acquired via the detector of the first modality. The temperature of the photodetector as well as the heating effect of the reference imaging sequence can be determined in dependence of the photopeak level. Thus, a temperature sensor for acquisition of a temperature value of the detector can advantageously be avoided.

In one embodiment of the inventive method, the plurality of imaging parameters of the reference imaging sequence comprises at least one of a strength, a frequency, a slew rate or a duty cycle of the gradient magnetic field and/or the high frequency electromagnetic field.

For example, a magnetic field strength may be characterized by a magnetic force exerted by the gradient magnetic field and/or the high frequency electromagnetic field. The magnetic field strengths of the gradient magnetic fields and/or the high frequency electromagnetic field may be different. The slew rate may be characterized by a ratio of a maximum magnetic field strength to a rise time required to ramp-up the magnetic field to the maximum magnetic field strength. A duty cycle may represent an amount or percentage of time the magnetic field works at maximum magnetic field strength during the reference imaging sequence. In addition to the imaging parameters mentioned above, the reference imaging sequence may of course include further imaging parameters usually associated with an imaging sequence of a magnetic resonance imaging device.

Preferably, properties of the gradient magnetic fields and/or the high frequency electromagnetic field may be related to the plurality of imaging parameters by performing a reference imaging sequence as described above. The imaging parameters and the related magnetic field properties may be used as a priori knowledge when determining the heating effect of an imaging sequence on the detector of the first modality.

By using the plurality of imaging parameters and the related magnetic field properties of the reference imaging sequence as a priori knowledge, temporally and/or spatially confined heating effects of the detector can be correlated with imaging parameters related to each of the applied gradient magnetic fields and/or the high frequency electromagnetic field. Thus, a contribution of individual imaging parameters to the heating effect can advantageously be identified when determining the heating effect of an imaging sequence on the detector.

In one embodiment of the inventive method, the at least one temperature dependent parameter of the detector is a temperature value, a photopeak level or a signal noise of the detector.

As described above, a temperature sensor may be avoided when determining the heating effect in dependence of a signal output of the detector, such as the photopeak level or the dark count rate. Thus, manufacturing costs of the detector can advantageously be reduced. However, in using a temperature value of a temperature sensor positioned in proximity to the detector as a temperature dependent parameter, an approximate temperature level of the detector may be acquired as a reference. The approximate temperature level can advantageously be complemented with other temperature dependent parameters in order to determine the heating effect on the detector. In particular, a plurality of temperature dependent parameters can be favorably used to complement each other, thus increasing an accuracy of the determined heating effect.

In one embodiment of the inventive method, a first compensation parameter of the temperature compensation unit is kept constant while the at least one temperature dependent parameter is acquired.

A first compensation parameter may be used by the temperature compensation unit to compensate for a temperature variation of the detector. It is conceivable, that the first compensation parameter is a cooling parameter of a cooling system configured to provide cooling to the combined imaging device, particularly to the detector of the first modality of the combined imaging device. In one embodiment, the detector of the first modality is cooled by a fluid of a cooling system, i.e. a water-cooling system or an air-cooling system. The compensation parameter may comprise for example a flowrate and/or a temperature of the fluid of the cooling system. In one embodiment, the first modality is a single-photon emission computed tomography device or a positron emission tomography device comprising a photon-sensitive detector with a photodetector. Photodetectors usually require a bias voltage (or supply voltage), which may also be used as a compensation parameter to compensate for temperature variations within the detector module.

It is conceivable, that a compensation parameter or a plurality of compensation parameters of the first modality are kept constant, while the at least one temperature dependent is acquired.

In keeping the compensation parameters of the first modality constant, the heating effect of the imaging sequence on the detector may be advantageously determined independent of an impact of a temperature compensating effect.

In one embodiment of the inventive method, the first compensation parameter is adjusted to compensate for a temperature variation of the detector while the at least one temperature dependent parameter of the detector is acquired.

It is conceivable, that the first compensation parameter is kept constant in a first iteration of at least one embodiment of an inventive method and is adjusted in a second iteration of at least one embodiment of the inventive method in order to determine a difference in the heating effect obtained via adjustment of the compensation parameter. However, the first compensation parameter may also be adjusted when performing a single iteration of at least one embodiment of the inventive method.

In one example, the bias voltage supplied to a photodetector may be adjusted to compensate for an increasing breakdown voltage of the photodetector due to the heating effect caused by the reference imaging sequence. In another example, a cooling parameter, as for example a flow rate and/or a temperature level of the cooling fluid, may be adjusted to compensate for a temperature variation of the detector. The heating effect on the detector may be quantified in dependence of a required adjustment of the first compensation parameter. It is also conceivable, that a multitude of compensation parameters, i.e. a first compensation parameter, a second compensation parameter, a third compensation parameter and so forth, are adjusted while acquiring the at least one temperature dependent parameter. One or more compensation parameters may also be kept constant, while other compensation parameters are adjusted to compensate for the heating effect in the detector. Adjusting the compensation parameter may be done in dependence of a temperature value of a temperature sensor positioned in proximity to the detector. As described above, however, such a temperature value may comprise a delay and/or an offset as compared to the actual temperature level in the detector.

In adjusting the first compensation parameter while acquiring the at least one temperature dependent parameter, the delay and/or offset of temperature value acquired by the temperature sensor with regard to the actual temperature of the detector can be characterized via correlation with the determined heating effect, e.g. via a transfer function. Depending on the delay and/or offset of the temperature sensor, an adjustment of a control strategy of the temperature compensation unit can be carried out to favorably enhance an accuracy of the temperature compensation when performing an imaging sequence.

In a further embodiment, the inventive method comprises the additional steps of acquiring a second temperature dependent parameter of the detector, wherein a second compensation parameter of the temperature compensation unit is set differently from the first compensation parameter and determining the heating effect on the detector in dependence of the plurality of imaging parameters of the reference imaging sequence, the second compensation parameter and the second temperature dependent parameter of the detector.

In this embodiment, at least one embodiment of the inventive method may be performed multiple times. This may comprise performing multiple reference imaging sequences via the magnetic resonance imaging device, each time acquiring at least one temperature dependent parameter and determining the heating effect of the reference imaging sequence on the detector of the first modality. In each iteration of at least one embodiment of the inventive method, a compensation parameter of the temperature compensation unit may be changed, while the plurality of imaging parameters of the reference imaging sequence remains constant. Thus, in a first iteration, the first compensation parameter may be set to a first value, whereas in a second iteration, the second compensation parameter may be set to a second value different from the first value.

Preferably, the compensation parameter is constant throughout one iteration of at least one embodiment of the inventive method. It is conceivable, that a third iteration, a fourth iteration or more iterations are performed accordingly. An iteration of at least one embodiment of the inventive method with different compensation parameters may yield different results for the at least one temperature dependent parameter used to determine the heating effect. Thus, the impact of varying compensation parameters on the heating effect may be determined.

The heating effect is determined at least in dependence of the plurality of imaging parameters of the reference imaging sequence performed in each iteration, as well as the second compensation parameter and the second temperature dependent parameter of the detector. However, the heating effect may be determined taking into account the first compensation parameter and the at least one temperature dependent parameter as well.

For example, the compensation parameter may be a cooling parameter, such as an inlet temperature of the cooling fluid to the detector, an outlet temperature of the cooling fluid from the detector and/or a flow rate of the cooling fluid. A change of the outlet temperature of the cooling fluid represents a change of a thermal capacity of the cooling fluid, which may depend on the heating effect of the reference imaging sequence on the detector. This change of thermal capacity may be correlated with a difference between the at least one temperature dependent parameter and the second temperature dependent parameter in order to quantify a heating effect of the reference imaging sequence on the detector.

In one embodiment, the temperature compensation unit may also be deactivated in a first iteration and activated in a second iteration of at least one embodiment of the inventive method, in order to determine the impact of the compensation parameter and/or the temperature compensation unit on the heating effect.

In adjusting the compensation parameter, the impact of the compensation parameter on the heating effect and the at least one temperature dependent value may be favorably recorded over a large parameter area. In one example, the acquired data can advantageously be used to expand the calibration database and/or calibration function, thus facilitating a process of determining the heating effect of an imaging sequence on the detector of the first modality.

In a further embodiment, the inventive method further comprises the step of predicting a heating effect of an imaging sequence on the detector by using an intelligent algorithm, wherein the intelligent algorithm is configured to predict the heating effect in dependence of a plurality of imaging parameters of the imaging sequence and data acquired via the reference imaging sequence.

An intelligent algorithm may comprise any kind of application of artificial intelligence. For example, an intelligent algorithm may comprise a machine learning algorithm, a neural network, a self-learning algorithm, an expert system, an optimization of a function, a method of data mining and the like.

In one embodiment, a neural network is configured to predict the heating effect of the imaging sequence on the detector in dependence of the plurality of imaging parameters of the reference imaging sequence as well as the at least one temperature dependent parameter and/or the respective heating effect acquired along with the reference imaging sequence. In particular, the neural network may be trained with data acquired via a reference imaging sequence. For example, such data may comprise the heating effect, the at least one temperature dependent parameter, the plurality of imaging parameters and/or a compensation parameter acquired along with the reference imaging sequence.

In another embodiment, an expert system is used to predict the heating effect of the imaging sequence. The expert system may have access to a database storing data acquired in previously performed reference imaging sequences. The database may be stored in an internal storage of the combined imaging device or an external storage, i.e. a server or a cloud. The database may also comprise data of previously performed imaging sequences of other combined imaging devices of the same type. It is also conceivable, that the expert system comprises a model of a relevant component of the combined imaging device and/or a calibration function in order to predict the heating effect of the imaging sequence on the detector. The expert system may further have access to a sensor (i.e. a temperature sensor) and/or a signal output of the detector in order to acquire a current value of the at least one temperature dependent parameter.

An intelligent algorithm may be self-adaptable to advantageously compensate for ageing effects of components and measurement value drift, which may otherwise lead to deviations regarding the determination of the heating effect. Furthermore, intelligent algorithms, such as neural networks and deep learning methods, may easily be trained with new calibration data. Thus, intelligent algorithms can be advantageously transferred to other devices and/or next generation devices with low effort.

In a preferred embodiment, the inventive method comprises the step of predicting a heating effect of an imaging sequence on the detector by using a model-based approach, wherein the model-based approach is configured to predict the heating effect in dependence of a plurality of imaging parameters of the imaging sequence and data acquired via the reference imaging sequence.

A model-based approach may comprise using an analytical, an empirical and/or a physical model of relevant components of the combined imaging device. Such models may comprise functions and/or algorithms relating a value of an imaging parameter to a property of the heating effect. For example, an empirical model may correlate a temperature distribution of the detector with values of individual imaging parameters of a reference imaging sequence via an empiric function. The empirical model may be derived from a calibration database comprising data of one or more reference imaging sequences with their respective temperature dependent parameters and/or heating effects. Thus, the heating effect of the imaging sequence may be predicted via the empiric function, even when values of individual imaging parameters are changed with regard to the reference imaging sequence.

The model-approach may further comprise an energy balance, wherein a percentage of the energy from the magnetic field is assumed to be transferred into heat energy increasing the temperature of the detector. Thus, the heating effect may be determined in dependence of a thermal mass of the detector and the transferred amount of energy. The percentage of the transferred energy and/or a pattern of temperature distribution in the detector may be determined in dependence of data derived from one or more reference imaging sequences. For example, data acquired via the reference sequence may comprise a plurality of imaging parameters, an acquired temperature dependent parameter, a determined heating effect and/or any further data associated with a reference imaging sequence.

The model-based approach may also comprise a numerical solution of a (differential) equation system configured to predict the heating effect of the imaging sequence on the detector. In order to solve the (differential) equation system, a one-dimensional or multi-dimensional model of the detector may be derived comprising discrete grid points. Predicting the heating effect may comprise numerically solving the (differential) equation system at the discrete grid points in dependence of the plurality of imaging parameters of the imaging sequence. It is conceivable, that the numerical model uses data from a reference imaging sequence as a boundary condition.

A model-based approach can advantageously predict the heating effect of an imaging sequence in a robust and reproduceable manner.

In one embodiment, the inventive method comprises the step of correcting a compensation parameter of the temperature compensation unit in dependence of a correction parameter in order to reduce an impact of the heating effect on the diagnostic data.

As described above, the combined imaging device comprises a temperature compensation unit, which is configured to compensate for a temperature variation in the detector by adjusting one or more compensation parameters. A compensation parameter may be adjusted continuously or in discrete time intervals. The temperature compensation unit may be configured to adjust the compensation parameter in dependence of a temperature value provided by a temperature sensor positioned in proximity to the detector. As described above, however, such a temperature value may comprise a delay and/or an offset to the actual temperature of the detector causing a deficient compensation of the temperature in the detector.

In one embodiment, the correction parameter may represent a temperature value or a temperature distribution of the detector determined in dependence of the heating effect, which may be determined or predicted as described above. The correction parameter may thus provide a close representation of the actual temperature or temperature distribution in the detector in contrast to the temperature sensor positioned in proximity to the detector. In one example, the correction parameter may correspond to a heating effect determined and/or predicted in dependence of the at least one temperature dependent parameter and a plurality of imaging parameters of the reference imaging sequence. In another example, the correction parameter may correspond to a variable configured to compensate for a delay and/or an offset of the temperature sensor when correlated with the temperature value of the temperature sensor or the compensation parameter. As described above, the correction parameter may also comprise a transfer function characterizing a difference between the temperature value acquired via the temperature sensor and the temperature of the detector determined via the heating effect.

The correction parameter may be transferred to the temperature compensation unit instead of or in addition to the temperature value provided by the temperature sensor. The temperature compensation unit may be configured to correlate the temperature value acquired via the temperature sensor with the correction parameter. It is also conceivable, that the temperature compensation unit comprises a logic unit configured to use the correction parameter instead of the temperature value provided by the temperature sensor, when a respective signal of the correction parameter is present.

In a further embodiment, the correction parameter is used to modify a signal of the temperature sensor before transferring the signal to the temperature compensation unit. The signal of the temperature sensor may be an analog or a digital signal. In another example, the correction parameter may be used to modify a compensation parameter at the output of the temperature compensation unit. For example, the compensation parameter may be output as an analog or digital signal. This analog or digital signal may be modified, i.e. via an analog circuit, a processing unit, a logic unit or the like, to account for the temperature value or temperature distribution determined in dependence of the heating effect.

A correction parameter can be used to increase an accuracy of the temperature compensation unit by correcting a delayed and/or deficient temperature value provided by a temperature sensor in proximity to the detector. Thus, an undesired temperature variation of the detector module can be reduced and a quality of diagnostic data acquired via the detector can be favorably increased.

According to at least one embodiment of the inventive method, a heating effect of an imaging sequence of a second imaging modality on a detector of a first modality of a combined imaging device is compensated, wherein the first modality is configured to acquire diagnostic data of an examination object and the second imaging modality comprises a magnetic resonance imaging device configured to acquire magnetic resonance imaging data of the examination object, wherein the first modality comprises a temperature compensation unit configured to compensate a temperature variation of the detector.

The first modality, the second modality and the temperature compensation unit of the combined imaging device may correspond to any of the embodiments described above.

In one step of at least one embodiment of the inventive method, the heating effect of an imaging sequence of the second imaging modality on the detector of the first modality is determined using a model-based approach. As described above, a model-based approach may comprise using an analytical model, a physical model and/or a numerical model of a component or a plurality of components of the combined imaging device in order to determine the heating effect. However, in contrast to performing a reference imaging sequence, the heating effect may be determined primarily in dependence of physical correlations and/or physical interactions between the first modality and the magnetic resonance imaging device, as well as data relating to geometric dimensions and/or structural properties of components of the combined imaging device and imaging parameters of the imaging sequence.

It is conceivable, that the heating effect determined via the model-based approach is an averaged quantity providing a mean heating rate of the detector and/or an amount of heat energy absorbed in the detector over a course of the imaging sequence. However, it is also conceivable, that the heating effect comprises a temporally resolved progression of the heating rate and/or the heat energy absorbed by the detector. In one example, the heating effect may be determined when imaging parameters of an imaging sequence are specified, e.g. before performing an imaging examination of a patient. However, it is also conceivable, that the heating effect is determined in discrete time steps while the imaging sequence is performed. Thus, temperature dependent parameters may be acquired from the combined imaging device in order to refine and/or update the heating effect via the model-based approach while the imaging sequence is running.

In a further step of at least one embodiment of the inventive method, a compensation parameter of the temperature compensation unit is adjusted in dependence of the heating effect. It is conceivable, that the temperature compensation unit comprises an input interface configured to receive the heating effect determined via the model-based approach. For example, the heating effect may be transmitted as an analog or digital signal via a suitable signal connection.

The temperature compensation unit may also be configured to determine the compensation parameter in dependence of a temperature value of a temperature sensor positioned in proximity to the detector of the first modality and the heating effect. In a preferred embodiment, the temperature compensation unit comprises a control unit which is configured to adjust a compensation parameter or a plurality of compensation parameters in dependence of the heating effect at discrete time steps while the imaging sequence is performed. For example, the temperature compensation unit may comprise a control loop configured to adjust a compensation parameter in dependence of the heating effect.

At least one embodiment of the inventive combined imaging device comprises a magnetic resonance imaging device and a first modality including a detector and a temperature compensation unit configured to compensate for a temperature variation of the detector. The combined imaging device is configured to acquire diagnostic data and magnetic resonance image data of an examination object positioned in an image acquisition region of the combined imaging device and to perform a method according to one of the embodiments described.

The combined imaging device may comprise any of the first modalities mentioned above. In a preferred embodiment, the first modality is a single-photon emission computed tomography device or a positron emission tomography device. In order to acquire, process and/or store data, as for example the at least one temperature dependent parameter, the plurality of imaging parameters and/or the heating effect, the combined imaging device may comprise components such as a control unit, a processing unit, a memory, an internal and/or an external storage unit, as well as a suitable interface configured to send and receive data and/or convert data into a desired data format.

The processing unit may comprise a logic unit, a controller, a microcontroller, a CPU, a GPU, a DSP, an FPGA and the like. The memory and the internal storage may comprise a RAM, ROM, PROM, EPROM, EEPROM, flash memory, as well as an HDD, an SSD and the like. However, the storage unit may also comprise an external database, i.e. located on an external server or a cloud and connected to the combined imaging device via a network connection. The data may be transported between components via analog and/or digital signals using suitable signal connections. The combined imaging device may comprise a single control unit configured to control the first modality and the second imaging modality or a plurality of control units configured to control specific components of the combined imaging device, such as the magnetic resonance imaging device, the first modality, the temperature compensation unit, a patient positioning device for positioning the examination object relative to the combined imaging device and so forth.

The first modality and the second imaging modality may be carried by the combined imaging device and/or be mechanically attached to the combined imaging device. It is also conceivable, that the first modality comprises a portable device like an ultrasound device or an electrocardiography device, which may be positioned on the second imaging modality or in proximity to the second imaging modality in order to acquire both diagnostic data and magnetic resonance image data from an examination object.

In one embodiment of the inventive of the combined imaging device, the temperature compensation unit is configured to adjust a compensation parameter in dependence of a heating effect and/or a correction parameter.

In a preferred embodiment, the temperature compensation unit may comprise a high voltage digital-analog-converter configured to feed a bias voltage to a photodetector of a single-photon emission computed tomography device or a positron emission tomography device. The bias voltage may be adjusted in dependence of a signal of a logic unit. The logic unit may be configured to receive a current temperature value acquired via a temperature sensor, the correction parameter determined in dependence of the heating effect and/or the heating effect according to an embodiment of at least one embodiment of the inventive method described above. The logic unit may further be configured to transmit a signal determining the desired bias voltage to the high voltage digital-analog-converter in dependence of the temperature value and the correction parameter.

In a further embodiment, the temperature compensation unit is configured to output the compensation parameter to a cooling system. The cooling system may be configured to adjust a flow rate of the cooling fluid or a temperature of the cooling fluid to compensate for the heating effect on the detector of the first modality.

By providing a temperature compensation unit configured to adjust a compensation parameter in dependence of a heating effect and/or a correction parameter, a temperature variation due to an imaging sequence of the magnetic resonance imaging device may be avoided. Thus, a quality of diagnostic data acquired via the detector of the first modality can advantageously be increased.

At least one embodiment is directed to an inventive computer program product. The computer program product can be loaded into a memory of a programmable processing unit of a combined imaging device and comprises program code segments to perform a method according to an embodiment of the invention when the computer program product is executed in the processing unit of the combined imaging device.

As a result, the method according to an embodiment of the invention can be carried out quickly, and in a robust and repeatable manner. The computer program product is configured in such a way that it can carry out the method steps according to an embodiment of the invention by way of the processing unit. The processing unit must in each case comprise the prerequisites such as a corresponding main memory, a corresponding graphics card or a corresponding logic unit, so that the respective method steps can be carried out efficiently.

The computer program product is, for example, stored on a computer-readable medium or stored on a network, a server or a cloud, from where it can be loaded into the processor of a local processing unit. The local processing unit can be directly connected to the combined imaging device or designed as part of the combined imaging device. Furthermore, control information of the computer program product can be stored on an electronically readable medium.

The control information on the electronically readable medium can be designed in such a way that, when the medium is used, it carries out a method according to an embodiment of the invention in a processing unit of the combined imaging device. Examples of an electronically readable medium are a DVD, a magnetic tape or a USB stick on which electronically readable control information, in particular software, is stored. If this control information is read from the medium and stored in a control and/or processing unit of a combined imaging device, all embodiments of at least one embodiment of the inventive method described above can be carried out.

FIG. 1 is a schematic representation of a combined imaging device 10 configured to perform a method according to an embodiment of the invention. In the depicted embodiment, the combined imaging device 10 comprises a magnetic resonance imaging device 11 and a positron emission tomography device 12.

The magnetic resonance imaging device 11 comprises a magnet arrangement 13 and an image acquisition region 14 for accommodating an examination object 15, in particular a patient 15. The image acquisition region 14 is enclosed by the magnet arrangement 13 in a circumferential direction. The patient 15 can be introduced into the image acquisition region 14 via a patient positioning device 16 movably arranged inside the image acquisition region 14. The magnet arrangement 13 may be supported by a cylindrical gantry (not shown) enclosing the image acquisition region 14 and comprising at least one opening for the for the patient to access the image acquisition region 14 via the patient positioning device 16.

The magnet arrangement 13 comprises a main magnet 17 which is configured to generate a strong and constant main magnetic field 18 in the image acquisition region 14. The magnet arrangement 13 further comprises a gradient coil unit 19 for generating gradient magnetic fields used for spatial encoding during a diagnostic examination. Additionally, the magnet arrangement 13 comprises a radio-frequency coil 20 integrated inside the magnet arrangement 13 and configured to provide a high frequency electromagnetic field in the image acquisition region 14. The radio-frequency coil 20 may also be configured to receive magnetic resonance signals.

In order to control the main magnet 17 of the gradient coil unit 19 as well as the radio-frequency coil 20, the combined imaging device 10 comprises a magnetic resonance control unit 21 (MR control unit 21). The MR control unit 21 centrally controls the magnetic resonance imaging device 11, i.e. to perform an imaging sequence such as a gradient echo sequence or a turbo spin echo sequence. The MR control unit 21 may further comprise a gradient control unit (not shown in further detail) and a radiofrequency antenna control unit (not shown in further detail). Furthermore, the MR control unit 21 may include a magnetic resonance evaluation unit for evaluating magnetic resonance image data.

The magnetic resonance imaging device 11 may comprise a surface coil 30 configured to receive magnetic resonance signals from the examination object 15. The surface coil 30 may be applied to a body region of the patient 15 that is to be examined via the magnetic resonance imaging device 11. In the depicted embodiment the surface coil 30 is configured as a body antenna unit. The surface coil 30 may also be designed to accommodate other body regions of the patient 15, as for example the knee and/or the back of the patient 15. It also conceivable for more than one surface coil 30 to be positioned on the patient 15.

The illustrated magnetic resonance imaging device 11 may of course include further components that magnetic resonance imaging devices 11 usually comprise. The general mode of operation of a magnetic resonance imaging device 11 is well-known to the person skilled in the art, so a detailed description of the general components is not deemed necessary.

The positron emission tomography device 12 comprises a photon-sensitive detector including a plurality of detector modules 22 arranged in a ring shape and encircling the image acquisition region 14 in the circumferential direction. Each of the detector modules 22 has a plurality of detector elements (not shown in further detail) such as a scintillator array having scintillation crystals (e.g. LSO crystals) and a photodetector comprising a photodiode array (e.g. an avalanche photodiode array) arranged downstream of the scintillator array inside the detector modules 22.

Photon pairs resulting from the annihilation of a positron with an electron are detected via the detector modules 22. The two photons each comprise an energy of approximately 511 keV and are typically send out along trajectories including an angle of approximately 180°. Positrons may be emitted by a radiopharmaceutical (positron-emitting tracer), which is usually administered to the patient 15 by way of an injection.

Each of the detector modules 22 additionally includes detector electronics comprising an electric amplifier circuit and further electronic components (not shown). In order to control the detector electronics and the detector modules 22, the combined imaging device 10, in particular the positron emission tomography device 12, comprises a positron emission tomography control unit 23 (PET control unit 23). The PET control unit 23 is configured to control the positron emission tomography device 12. Furthermore, the PET control unit 23 may comprise an evaluation unit for evaluating functional data acquired via the positron emission tomography device 12. The illustrated positron emission tomography device 12 can of course include further components that positron emission tomography devices 12 typically have. The general mode of operation of a positron emission tomography device 12 is well-known to the person skilled in the art, so a detailed description of the general components is deemed not necessary.

The combined imaging device 10 may comprise a central processing unit 24 configured to coordinate an acquisition and/or an evaluation of magnetic resonance image data and of positron emission tomography image data. The central processing unit 24 may also comprise a central system control unit (not shown) configured to control the MR control unit 21 and/or the PET control unit 23. However, the central processing unit 24 may also comprise the MR control unit 21 and/or the PET control unit 23. The central processing unit 24, as well as the MR control unit 21 and/or the PET control unit 23 may be connected to an internal storage unit 27. The internal storage unit 27 may store data on previously performed reference imaging sequences of the magnetic resonance imaging device 11. Such data may comprise, for example, a plurality of imaging parameters of a reference imaging sequence, one or more temperature dependent parameters, as well as a heating effect of the reference imaging sequence on a detector module 22 of the positron emission tomography device 12. The central processing unit 24 may also be connected to a cloud storage 28 via a network connection. The cloud storage 28 may comprise respective data of other combined imaging devices 10 of the same type.

Control information such as imaging parameters as well as reconstructed image data can be displayed on a display unit 25. The display unit 25 may comprise at least one monitor configured to display control information and/or image data of the combined imaging device 10 to an operator. The combined imaging device 10 further comprises an input unit 26 configured to receive information and/or parameters input by the operator during a measurement procedure.

The PET control unit 23 may further comprise a temperature compensation unit 59 configured to adjust a bias voltage provided to the detector module 22. The temperature compensation unit 59 may be connected to a temperature sensor 56 (not shown) positioned in proximity to the photodiode array of the detector module 22 and configured to acquire a temperature value of the detector module 22. The temperature compensation unit 59 is described in further detail in FIG. 4.

Figure 2:
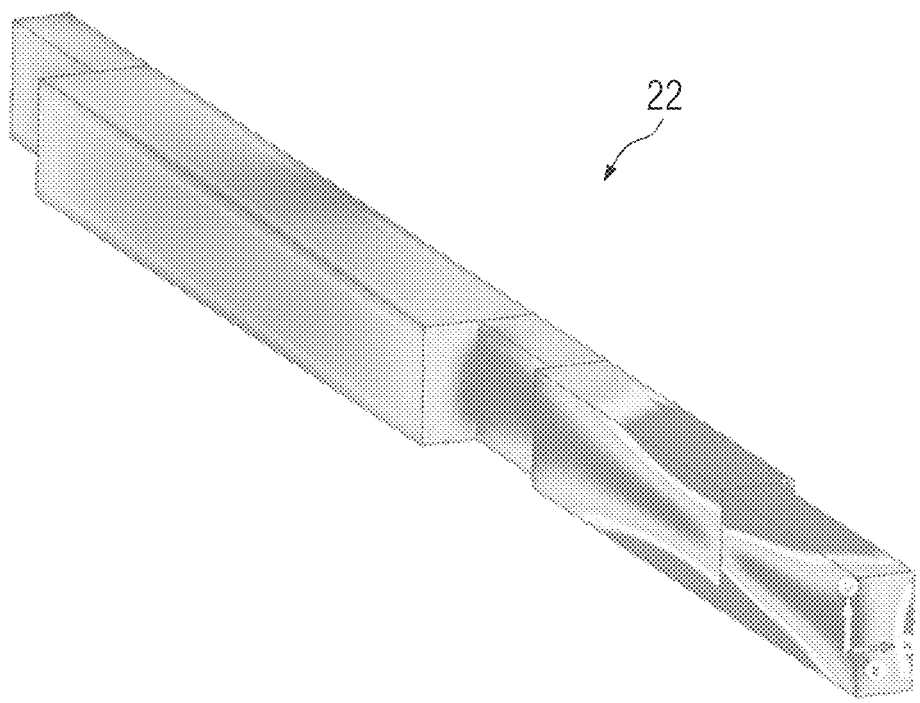

FIG. 2 shows an example temperature distribution in a detector module 22 of a positron emission tomography device 12. The temperature distribution may represent a heating effect determined via a model-based approach, i.e. a numerical simulation configured to predict the heating effect of an imaging sequence of a magnetic resonance imaging device 11 on the detector module 22 of the positron emission tomography device 12. In the depicted example, dark-colored regions of the detector module 22 may relate to a higher temperature than light-colored regions. The heating effect predicted by the model indicates that the temperature is inhomogeneously distributed over the detector module 22. It is conceivable, that the end of the detector module 22 oriented in the Z-direction is positioned closer to a gradient magnetic field provided by the gradient unit 19 of the magnetic resonance imaging device 11. In order to compensate for localized hot spots with elevated temperatures, a bias voltage of related sections of the detector module 22 may be adjusted via the temperature compensation unit 59.

Figure 3:
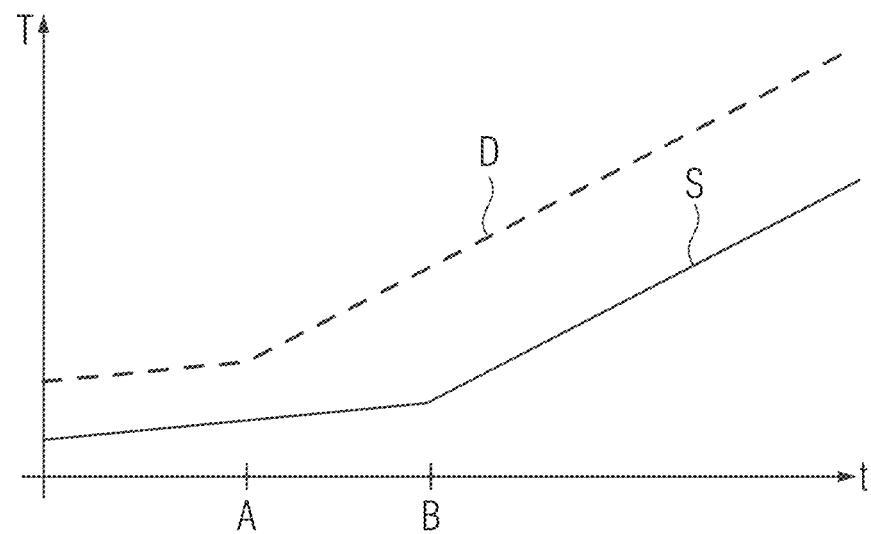

FIG. 3 depicts a schematic temperature development in the detector module 22 of a positron emission tomography device 12 over the course of an imaging sequence of the magnetic resonance imaging device 11. The diagram shows a development of the temperatures T of an arbitrarily chosen volume element (D) of the detector module 22 and the temperature value acquired via the temperature sensor 56 (S) over a time t.

The combined imaging device 10 may be in a standby-mode of operation, before an imaging sequence of the magnetic resonance imaging device 11 is initialized at a time A. In the standby-mode, the temperature of the volume element (D) and the temperature value (S) may increase in an equal manner, for example due to heating of electric components in the standby-mode. However, when initializing the imaging sequence at the time A, the temperature of the volume element of the detector module 22 increases immediately due to eddy-currents induced in electrical conductors in the detector module 22. In contrast, the temperature value (S) acquired via the temperature sensor 56 may not immediately reflect the actual temperature in the volume element (D) of the detector module 22, as it is separated from the detector module 22 via a thermal bridge 55 (see FIG. 4).

In dependence of the heat conduction properties of the detector module 22, the thermal bridge 55 and the temperature sensor 56, the heating effect of the imaging sequence on the detector module 22 may be registered at a time B, when the temperature of the volume element (D) of the detector module 22 has already increased further. Thus, the temperature sensor 56 may not provide an accurate indication of the temperature of the detector module 22. In order to compensate for this deficiency, the combined imaging device 10 may comprise a temperature compensation unit 59 having access to a determined and/or predicted heating effect and/or a correction parameter provided via a method according to an embodiment of the invention.

FIG. 4 shows a schematic representation of a temperature compensation unit 59 of a positron emission tomography device 12. The temperature compensation unit 59 may comprise a current monitor 51 configured to monitor a bias current of the photodiode array, a high voltage digital-analog-converter 52 configured to feed a bias voltage to the photodiode array and a logic unit 53 configured to control the high voltage digital-analog-converter 52. The logic unit 53 may comprise for instance a logic circuit, a controller, a microcontroller, a processor, a memory, as well as an input interface and an output interface to receive and process signals from the current monitor 51 and from the temperature sensor 56 positioned in proximity to the detector module 22. The signals of the temperature sensor 56 and the current monitor 51 may comprise analog or digital signals. In particular, the logic unit 51 may be configured to receive a predicted and/or determined heating effect and/or a correction parameter via a dedicated signal port 60.

The predicted and/or determined heating effect and/or correction parameter may be provided by the PET control unit 23 or the central processing unit 24, which may be configured to perform a method according to an embodiment of the invention. In dependence of the predicted and/or determined heating effect and/or correction parameter, as well as the temperature value acquired via the temperature sensor 56, the logic unit 53 controls the high voltage digital-analog-converter 52 to output a bias voltage to the photodiode array 54 of the detector module 22. The output from the logic unit 53 and/or the output from the high voltage analog-digital-converter may be regarded as a compensation parameter configured to compensate for a temperature variation in the photodiode array 54 of the detector module 22. It is conceivable, that one or more elements of the temperature compensation unit, e.g. the logic unit 53, the current monitor 51 and/or the high voltage digital-analog-converter 52, are integrated into a combined analog circuit.

As depicted in FIG. 4, the photodiode array 54 may be connected to the temperature sensor 56 via a thermal bridge 55, which is configured to provide for a heat conduction from the photodiode array 54 to the temperature sensor 56. However, the temperature compensation unit 59 may also be configured to output a compensation parameter to a cooling system (not shown) configured to adjust a temperature and/or a flow rate of a cooling fluid in order to compensate for the heating effect of an imaging sequence on detector module 22 of the positron emission tomography device 12.

FIG. 5 shows a flowchart of an embodiment of an inventive method for determining a heating effect of an imaging sequence of a magnetic resonance imaging device 11 on a detector of a positron emission tomography device 12 of a combined imaging device 10 in dependence of a reference imaging sequence of the magnetic resonance imaging device 11, wherein the positron emission tomography device 12 is configured to acquire functional data of a patient 15 and the magnetic resonance imaging device 11 is configured to acquire magnetic resonance image data of the patient 15, wherein the positron emission tomography device 12 comprises a temperature compensation unit 59 configured to compensate a temperature variation of the detector.

In an optional step S1, a radiation source is positioned in a relative position to the image acquisition region 14 of the combined imaging device 10, the radiation source being configured to emit a predefined level of radiation in a direction of the detector of the positron emission tomography device 12. In order to position the radiation source in a relative position to the image acquisition region 14 of the combined imaging device 10, the radiation source may be placed on a patient positioning device 16 and moved manually or automatically into the image acquisition region 14. When positioned in the image acquisition region 14, the radiation source is enclosed by the detector modules 22 of the positron emission tomography device 12 in a circumferential direction. As described above, the radiation source may comprise a water solution including a radiopharmaceutical such as a positron-emitting tracer. The radiation source may further comprise a phantom made of tissue or fabric, which may provide a container for the radiation source, as well as matter for interaction with the emitted positrons.

In a step S2, a reference imaging sequence is performed with the magnetic resonance imaging device 11, wherein the reference imaging sequence comprises applying a gradient magnetic field and/or a high frequency electromagnetic field to the image acquisition region 14 of the combined imaging device 10. The reference imaging sequence may be characterized by a plurality of imaging parameters determining a property of the gradient magnetic field and/or the high frequency electromagnetic field. For example, such a property may be a strength, a frequency, a slew rate and/or a duty cycle of the respective magnetic field applied to the image acquisition region 14. However, other properties of magnetic fields commonly used in magnetic resonance imaging devices are also conceivable.

The reference imaging sequence may be any imaging sequence used in a conventional diagnostic examination of a patient 15. In a preferred embodiment, the reference imaging sequence comprises a predetermined set of imaging parameters selected to cause a specific heating effect in the detector module 22 of the positron emission tomography device 12. The plurality of imaging parameters of the reference imaging sequence may be entered or selected by an operator of the combined imaging device 10 via the input unit 26. For example, the reference imaging sequence may be stored in a storage unit connected to the central processing unit 24 of the combined imaging device 10 and may be presented to the operator via the display unit 25 for selection. The central processing unit 24 and/or the MR control unit 21 are configured to control the gradient coil unit 19 and/or the radio-frequency coil 20 to provide a gradient magnetic field and/or a high frequency electromagnetic field according to the reference imaging sequence within the imaging acquisition region 14 of the magnetic resonance imaging device 11. The execution of the reference imaging sequence may cause the gradient magnetic fields and/or the high frequency electromagnetic field to change within short time intervals, thus inducing eddy currents in electrical conductors of the detector modules 22 of the positron emission tomography device 12 causing a heating effect.

In a step S3, at least one temperature dependent parameter of the positron emission tomography device 12 is acquired. In one example, a signal noise (e.g. a dark count rate), a photopeak level and/or a temperature value of the detector module 22 are acquired while the reference imaging sequence is performed and/or when the reference imaging sequence is completed. In another example, an inlet temperature and/or an outlet temperature of a fluid of cooling system is acquired as a temperature dependent parameter. Preferably, the at least on temperature dependent parameter is acquired via a suitable sensor. However, the temperature dependent parameter may also comprise a quantity, which may be determined or calculated in dependence of one or more measurement quantities acquired via suitable sensors, such as the ones mentioned above.

In one embodiment, the bias voltage (first compensation parameter) provided via the temperature compensation unit 59 is kept constant while the photopeak level (at least one temperature dependent parameter) is acquired. In keeping the bias voltage of the photodiode array 54 constant, an impact of the bias voltage on the photopeak level and/or the dark count rate can be avoided. Thus, a heating effect on the detector can be derived from the photopeak level and/or the dark count rate as a relative quantity.

In a further embodiment, the bias voltage provided via the temperature compensation unit 59 is adjusted to compensate for a temperature variation of the detector while the photopeak level is acquired. For example, the bias voltage of the photodiode array 54 may be adjusted in dependence of the temperature value provided via the temperature sensor 56 to compensate for an increasing breakdown voltage of the photodiode array 54 due to the heating effect caused by the reference imaging sequence. However, as shown in FIG. 3, the temperature value acquired via the temperature sensor 56 may provide a delayed indication of the actual temperature in the detector. Thus, determining the heating effect in dependence of a photopeak level acquired while the bias voltage is adjusted may provide a quantification of the delay or error associated with the temperature sensor 56. This quantification may be used to adapt a control strategy of the temperature compensation unit 59 in order to compensate for the heating effect when relying on the temperature value of the temperature sensor 56.

In a step S4, the heating effect on the detector of the positron emission tomography device 12 is determined in dependence of the plurality of imaging parameters of the reference imaging sequence and the at least one temperature dependent parameter of the detector. In one example, the heating effect on the detector may be determined by complementing the temperature value acquired via the temperature sensor 56 with one or more temperature dependent parameters, as for example the photopeak level and/or the dark count rate of the detector. In another example, the heating effect on the detector may be determined via a physical model correlating the value of the photopeak level and/or the dark count rate with the temperature distribution in the detector. In still further examples, the heating effect on the detector may be determined in dependence of a calibration function and/or a calibration database, an interpolation or extrapolation method and/or an intelligent algorithm. It is conceivable, that one or more of the approaches mentioned above are used to determine the heating effect of the reference imaging sequence on the detector of the positron emission tomography device 12.

In an optional step S5, a second temperature dependent parameter of the detector is acquired, wherein a second compensation parameter of the temperature compensation unit is set differently from the first compensation parameter. Preferably, the second temperature dependent parameter corresponds to the at least one temperature dependent parameter acquired in step S3, e.g. the photopeak level of the detector. In one embodiment, the first compensation parameter and the second compensation parameter are represented by a flow rate of a fluid of a cooling system. Thus, in step S5 the second flow rate (second compensation parameter) is set differently from the first flow rate (first compensation parameter) in step S3 in order to evoke a different value for the second photopeak level (second temperature dependent value).

In an optional step S6, the heating effect on the detector is determined in dependence of the plurality of imaging parameters of the reference imaging sequence, the second compensation parameter and second temperature dependent parameter of the detector. In one embodiment, the heating effect on the detector may be determined in dependence of the second flow rate and the second photopeak level as described above. However, the heating effect may also be determined in dependence of a difference between the first photopeak level and the second photopeak level, as well as the first flow rate and the second flow rate. The difference between the first photopeak level and the second photopeak level may quantify a temperature difference of the detector. This quantification of the temperature difference may be correlated with a heat energy absorbed via the cooling fluid, e.g. obtained via the difference between the first flow rate and the second flow rate, as well as a difference between a first outlet temperature and a second outlet temperature of the cooling fluid from the detector module 22. The absorbed heat energy may be correlated with the change of the at least one temperature dependent parameter in order to determine the heating effect of the reference imaging sequence on the detector.

In an optional step S7, a heating effect of an imaging sequence on the detector is predicted by using an intelligent algorithm, wherein the intelligent algorithm is configured to predict the heating effect in dependence of a plurality of imaging parameters of the imaging sequence and data acquired via the reference imaging sequence. In one embodiment, the intelligent algorithm comprises an expert system configured to predict the heating effect of the imaging sequence in dependence of data obtained from a previously performed reference imaging sequence. The expert system may have access to an internal storage unit 27 and/or an external storage unit 28 storing data related to such reference imaging sequences in a database. Preferably, the database comprises data of previously performed imaging sequences and/or reference imaging sequences, e.g. of the same combined imaging device 10 or of other combined imaging devices 10 of the same type. In one embodiment, the expert system is configured to interpolate or extrapolate the heating effect in dependence of a heating effect and a plurality of imaging parameters of a previously performed imaging sequence. However, the expert system may also comprise models of relevant components of the combined imaging device 10. Such models may be configured to correlate individual imaging parameters of a reference imaging sequence with a corresponding heating effect. The models may further be used to complement the heating effect obtained via interpolation or extrapolation or to take into account dependencies between the imaging parameters and the heating effect, which may not be represented via a regression analysis of available data.

In an optional step S8, a heating effect of an imaging sequence on the detector is predicted by using a model-based approach, wherein the model-based approach is configured to predict the heating effect in dependence of a plurality of imaging parameters of the imaging sequence and data acquired via the reference imaging sequence.

The model-based approach may comprise using an analytical, an empirical and/or a physical model of relevant components of the combined imaging device 10. For example, an empirical model is derived, correlating a heating effect on the detector with a predetermined set of imaging parameters of a previously performed reference imaging sequence via an empiric function. The empiric function may then be used for a prediction of the heating effect of the imaging sequence with a different set of imaging parameters as compared to the previously performed reference imaging sequence. Preferably, the empirical model is derived from a calibration database comprising data of one or more reference imaging sequences with their respective temperature dependent parameters and/or heating effects. As described above, data related to one or more reference imaging sequences may be stored in an internal storage unit 27 and/or an external storage unit 28 and accessed via the central processing unit 24 and/or the PET control unit 23 of the combined imaging device 10.

In a step S9, a compensation parameter of the combined imaging system is corrected in dependence of a correction parameter in order to reduce an impact of the heating effect on the diagnostic data. In one embodiment, the correction parameter represents a temperature distribution of the detector module 22, which may be determined or predicted via the heating effect as described above. In a further embodiment, the correction parameter corresponds to a variable, which is configured to compensate for a delay and/or an offset of the temperature sensor positioned in proximity to the detector when correlated with the temperature value of the temperature sensor or the compensation parameter.

The correction parameter may be used to modify an analog or digital signal of the temperature sensor 56 and/or the bias voltage output via the high voltage analog-digital-converter 52. Particularly, the correction parameter may be used to compensate for a delay and/or offset of the temperature sensor 56 positioned in proximity to the detector module 22.

For example, the correction parameter may be transferred to the logic unit 53 of the temperature compensation unit 59 via the signal port 60. In dependence of the correction parameter and/or the temperature value acquired via the temperature sensor 56, the logic unit 53 controls the high voltage digital-analog-converter 52 to output a bias voltage to the photodiode array 54 of the detector module 22 to compensate for a temperature variation of the detector module 22.

FIG. 6 shows a schematic flowchart of an embodiment of an inventive method for compensating the heating effect of an imaging sequence of the magnetic resonance imaging device 11 on the detector of the positron emission tomography device 12.

In the step S1a, the heating effect of an imaging sequence of the magnetic resonance imaging device 11 on the detector of the positron emission tomography device 12 is determined using a model-based approach. As described above, a model-based approach may comprise using an analytical model, a physical model and/or a numerical model of a component or a plurality of components of the combined imaging device 10 in order to determine the heating effect. It is conceivable, that the model-based approach is implemented on the central processing unit 24 in such a way, that the central processing unit 24 is configured to determine the heating effect. The central processing unit 24 may have access to a current set of imaging parameters, e.g. input by an operator via the input unit 26, and/or data relating to geometric dimensions and/or structural properties of components of the combined imaging device 10 stored in the internal storage unit 27 or the external storage unit 28.

Preferably, determining the heating effect comprises determining a temporal progression of the heating rate and/or the heat energy absorbed by the detector of the first modality. In one embodiment, the heating effect is determined in discrete time steps while the imaging sequence is performed. It is conceivable, that temperature dependent parameters are acquired at the same time steps or at similarly spaced time intervals in order to refine and/or update the determination of the heating effect via the model-based approach. However, the heating effect may also be determined in dependence of a specific set of imaging parameters before an imaging sequence comprising the specific set of imaging parameters is performed.

In the step S2a, a compensation parameter of the temperature compensation unit is adjusted in dependence of the heating effect. The heating effect may be provided to the logic unit 53 of the temperature compensation unit 59 via the signal port 60 (see FIG. 4). In a preferred embodiment, the logic unit 53 of the temperature compensation unit 59 may further be configured to adjust the compensation parameter in dependence of a temperature value provided by the temperature sensor 56 and the heating effect at discrete time steps while the imaging sequence is performed. Particularly, the temperature compensation unit 59 may comprise a control loop configured to adjust a compensation parameter in dependence of the heating effect.

It shall be understood that the embodiments described above are to be recognized as examples. Individual embodiments may be extended by features of other embodiments. Particularly, the sequence of the steps of at least one embodiment of the inventive methods are to be understood as example. The individual steps may be carried out in a different order and/or overlap partially or completely in time.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining a heating effect caused by an imaging sequence of a second imaging modality on a detector of a first modality of a combined imaging device in dependence of a reference imaging sequence of the second imaging modality, the first modality being configured to acquire diagnostic data of an examination object, the second imaging modality including a magnetic resonance imaging device configured to acquire magnetic resonance imaging data of the examination object, and the first modality including a first modality temperature compensation unit configured to compensate a temperature variation of the detector, the method comprising:
performing the reference imaging sequence using the second imaging modality including the magnetic resonance imaging device, the reference imaging sequence including applying at least one of a gradient magnetic field or a high frequency electromagnetic field to an image acquisition region of the combined imaging device, and the reference imaging sequence including a plurality of magnetic resonance imaging parameters determining a property of the at least one of the gradient magnetic field or the high frequency electromagnetic field;
acquiring at least one temperature dependent parameter of the detector of the first modality; and
determining a correction parameter for the first modality temperature compensation unit in dependence of the plurality of magnetic resonance imaging parameters of the reference imaging sequence performed using the second imaging modality and the at least one temperature dependent parameter of the detector of the first modality.

2. The method of claim 1, further comprising:
positioning a radiation source in a relative position to the image acquisition region of the combined imaging device, the radiation source being configured to emit a defined level of radiation in a direction of the detector of the first modality.

3. The method of claim 1, wherein the plurality of magnetic resonance imaging parameters of the reference imaging sequence comprises at least one of a strength, a frequency, or a slew rate or a duty cycle of at least one of the gradient magnetic field or the high frequency electromagnetic field.

4. The method of claim 1, wherein the acquiring the at least one temperature dependent parameter includes keeping a first compensation parameter of the first modality temperature compensation unit constant while the at least one temperature dependent parameter is acquired.

5. The method of claim 1, wherein the acquiring the at least one temperature dependent parameter includes adjusting a first compensation parameter to compensate for a temperature variation of the detector while the at least one temperature dependent parameter of the detector is acquired.

6. The method of claim 4, further comprising:
acquiring a second temperature dependent parameter of the detector, a second compensation parameter of the first modality temperature compensation unit being set differently from the first compensation parameter; and determining the correction parameter for the first modality temperature compensation unit in dependence of the plurality of magnetic resonance imaging parameters of the reference imaging sequence, the second compensation parameter, and the second temperature dependent parameter of the detector.

7. The method of claim 1, further comprising:

predicting a heating effect of an imaging sequence on the detector by using an intelligent algorithm, the intelligent algorithm being configured to predict the heating effect in dependence of a plurality of imaging parameters of the imaging sequence and data acquired via the reference imaging sequence.

8. The method of claim 1, further comprising:

predicting a heating effect of an imaging sequence on the detector by using a model-based approach, the model-based approach being configured to predict the heating effect in dependence of a plurality of imaging parameters of the imaging sequence and data acquired via the reference imaging sequence.

9. The method of claim 1, further comprising:

correcting a compensation parameter of the first modality temperature compensation unit in dependence of the correction parameter, to reduce an impact of the heating effect on the diagnostic data.

10. The method of claim 2, wherein the plurality of magnetic resonance imaging parameters of the reference imaging sequence comprises at least one of a strength, a frequency, or a slew rate or a duty cycle of at least one of the gradient magnetic field or the high frequency electromagnetic field.

11. The method of claim 2, wherein the acquiring the at least one temperature dependent parameter includes keeping a first compensation parameter of the first modality temperature compensation unit constant while the at least one temperature dependent parameter is acquired.

12. The method of claim 2, wherein the acquiring the at least one temperature dependent parameter including adjusting a first compensation parameter to compensate for a temperature variation of the detector while the at least one temperature dependent parameter of the detector is acquired.

13. The method of claim 11, further comprising:

acquiring a second temperature dependent parameter of the detector, a second compensation parameter of the first modality temperature compensation unit being set differently from the first compensation parameter; and determining the correction parameter for the first modality temperature compensation unit in dependence of the plurality of magnetic resonance imaging parameters of the reference imaging sequence, the second compensation parameter, and the second temperature dependent parameter of the detector.

14. The method of claim 2, further comprising:

predicting a heating effect of an imaging sequence on the detector by using an intelligent algorithm, the intelligent algorithm being configured to predict the heating effect in dependence of a plurality of imaging parameters of the imaging sequence and data acquired via the reference imaging sequence.

15. The method of claim 2, further comprising:

predicting a heating effect of an imaging sequence on the detector by using a model-based approach, the model-based approach being configured to predict the heating effect in dependence of a plurality of imaging parameters of the imaging sequence and data acquired via the reference imaging sequence.

16. The method of claim 2, further comprising:

correcting a compensation parameter of the first modality temperature compensation unit in dependence of the correction parameter, to reduce an impact of the heating effect on the diagnostic data.

17. The method of claim 1, wherein the at least one temperature dependent parameter is at least one of a temperature value, a photopeak level indicating an energy level at which a majority of photons are deposited in a photon-sensitive material of the detector of the first modality, a power consumption, or a bias current.

18. A non-transitory computer program product, loadable into a memory of a programmable processing unit of a combined imaging device, storing program code segments to perform a method for determining a heating effect caused by an imaging sequence of a second imaging modality on a detector of a first modality of a combined imaging device in dependence of a reference imaging sequence of the second imaging modality when the computer program is executed in the processing unit of the combined imaging device, the first modality being configured to acquire diagnostic data of an examination object, the second imaging modality including a magnetic resonance imaging device configured to acquire magnetic resonance imaging data of the examination object, and the first modality including a first modality temperature compensation unit configured to compensate a temperature variation of the detector, and the method comprising:

performing the reference imaging sequence using the second imaging modality including the magnetic resonance imaging device, the reference imaging sequence including applying at least one of a gradient magnetic field or a high frequency electromagnetic field to an image acquisition region of the combined imaging device, and the reference imaging sequence including a plurality of magnetic resonance imaging parameters determining a property of the at least one of the gradient magnetic field or the high frequency electromagnetic field;

acquiring at least one temperature dependent parameter of the detector of the first modality; and determining a correction parameter for the first modality temperature compensation unit in dependence of the plurality of magnetic resonance imaging parameters of the reference imaging sequence performed using the second imaging modality and the at least one temperature dependent parameter of the detector.

* * * * *